March 31, 1970 W. L. BROWN Re. 26,841

COMBINED VEHICLE DIRECTION AND FLARE SIGNAL

Original Filed Jan. 15, 1962 2 Sheets-Sheet 1

INVENTOR.
William L. Brown

BY
Learman, Learman & McCulloch
ATTORNEYS

COMBINED VEHICLE DIRECTION AND FLARE SIGNAL

Original Filed Jan. 15, 1962 2 Sheets-Sheet 2

INVENTOR.
William L. Brown
BY
Learman, Learman & McCulloch
ATTORNEYS

United States Patent Office

Re. 26,841
Reissued Mar. 31, 1970

26,841
COMBINED VEHICLE DIRECTION AND FLARE SIGNAL

William L. Brown, Garden City, Mich., assignor to Essex International, Inc., a corporation of Michigan Original No. 3,235,837, dated Feb. 15, 1966, Ser. No. 166,157, Jan. 15, 1962. Application for reissue Oct. 21, 1968, Ser. No. 807,461
Int. Cl. B60q 1/52
U.S. Cl. 340—81 19 Claims

Matter enclosed in heavy brackets [ ] appears in the original patent but forms no part of this reissue specification; matter printed in italics indicates the additions made by reissue.

*ABSTRACT OF THE DISCLOSURE*

*Signaling apparatus for a vehicle having rotatable steering means for turning the vehicle to the left or to the right and having left hand and right hand signaling indicators operable simultaneously to indicate a hazard warning, the signaling indicators being cancelable simultaneously in response to rotation of the steering means either to the left or to the right.*

This invention relates to signaling apparatus for automotive vehicles having devices operable to signal either a left-hand or a right-hand turn, and more particularly the invention relates to apparatus for operating both the left-hand and right-hand turn signaling devices simultaneously, thereby enabling the direction signaling apparatus of a parked or disabled vehicle to function as a warning device to the drivers of approaching vehicles.

Automotive vehicles currently are provided with front and rear lamps at both the left-hand and right-hand sides of a vehicle and with manipulatable means to effect flashing of either the left-hand set of lamps or the right-hand set of lamps to indicate, respectively, a left-hand or a right-hand turn. In some instances the turn signaling devices are canceled automatically upon the completion of a turn, whereas in other instances it is necessary for a vehicle driver to cancel the turn signal manually. It previously has been proposed to provide auxiliary apparatus for operating both the left-hand and right-hand signaling devices simultaneously but such proposals have not been altogether acceptable for a number of reasons.

One objection to known warning signal devices is that they are incapable of automatic cancellation once they have been actuated. That is, it has been necessary heretofore to disable the warning signal apparatus manually, but it frequently happens that the operator of the vehicle neglects to disable the warning signal, with the result that the turn signaling and brake actuated stop signal mechanisms are incapable of proper functioning.

Another objection to known warning signal systems is that they frequently rely upon manipulation of the same switches which are utilized to effect operation of the direction signaling apparatus. The direction signaling control switches, therefore, must be capable of being operated either selectively or simultaneously, depending upon the kind of signaling to be accomplished, and a demand of this kind can result in undesirable play or looseness of the direction signaling apparatus, the warning signaling apparatus, or both, with the result that neither apparatus functions in a proper manner. A corollary disadvantage of the apparatus just described is that it necessitates a rather complex wiring of the direction and warning signaling devices which is expensive in both manufacture and servicing.

An object of this invention is to provide warning signaling apparatus which overcomes the disadvantages of known devices for a similar purpose.

Another object of the invention is to provide warning signaling apparatus which is movable manually from a disabled position to an operating position and which is capable of being canceled either automatically or manually.

A further object of the invention is to provide automatically cancellable warning signaling apparatus that is cancelable by the same apparatus that is utilized to cancel the direction signaling devices.

Another object of the invention is to provide warning signaling operating means that is independent of the direction signaling operating means, but which is capable of utilizing the major portion of the direction signaling circuitry.

A further object of the invention is to provide warning signaling apparatus which is simplified in construction and requires relatively few parts.

Other objects and advantages of the invention will be pointed out specifically or will become apparent from the following description when it is considered in conjunction with the appended claims and the accompanying drawings, in which:

Figure 1:
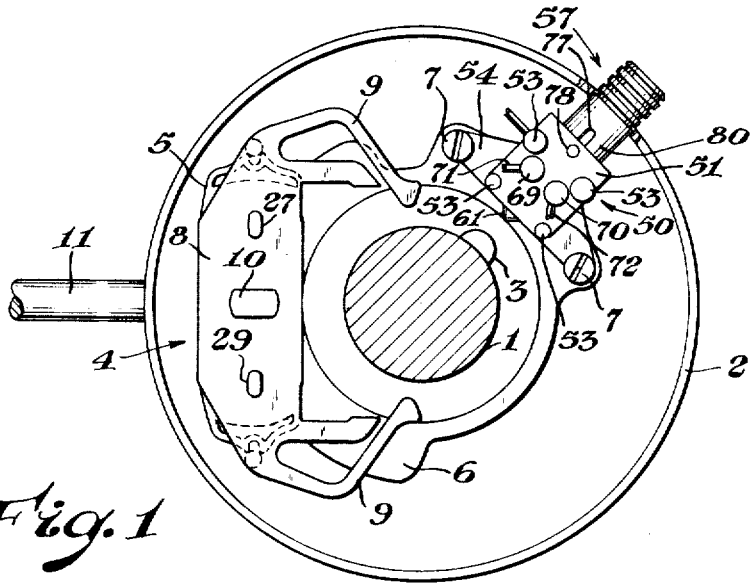
FIGURE 1 is a view partly in plan and partly in section of warning signaling apparatus mounted in association with direction signaling operating means.
Figure 3:
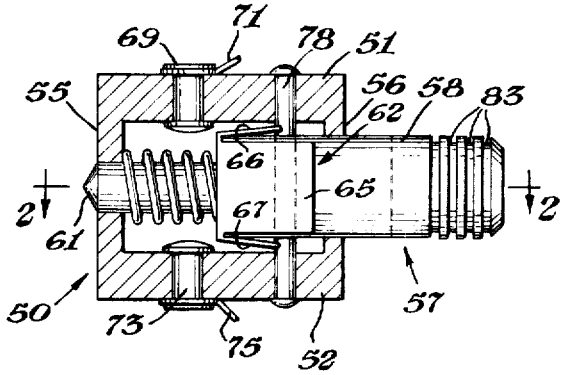
FIGURE 3 is a sectional view of the mechanism taken on the line 3—3 of FIGURE 2.

Apparatus constructed in accordance with the invention is adapted for use in conjunction with rotatable steering means such as a steering shaft 1 that is mounted to rotate within a tubular column that terminates in a cylindrical housing 2, the upper end of the shaft being fixed to a rotatable steering wheel (not shown). The shaft 1 may be provided with one or more rotatable cams 3 or, if desired, the cams may form part of the steering wheel assembly so as to rotate with the latter. Mounted within the housing 2 is direction signaling mechanism 4 which may be of the kind disclosed in Patent No. 2,999,911, issued September 12, 1961, and comprising a switch casing 5 that is supported on a mounting ring 6 which is secured to the housing 2 by suitable means such as screws, two of which are shown at 7 in FIGURE 1.

Rockably mounted on the switch casing 5 is an actuating member 8 having a pair of flexible return fingers 9, the member 8 being fast on a rock shaft 10 that is journaled for rotation in the casing 5. The shaft 10 is connected to an operating lever 11 which is manually movable from a neutral position, as shown in FIGURE 1, to operating positions on opposite sides of the neutral position so as to project one or the other of the return fingers 9 into the path of rotation of the cam 3. Engagement between the cam 3 and either one of the return fingers 9 will effect restoration of the direction signaling apparatus to its neutral position in the manner more fully disclosed in the aforementioned patent.

Figure 5:
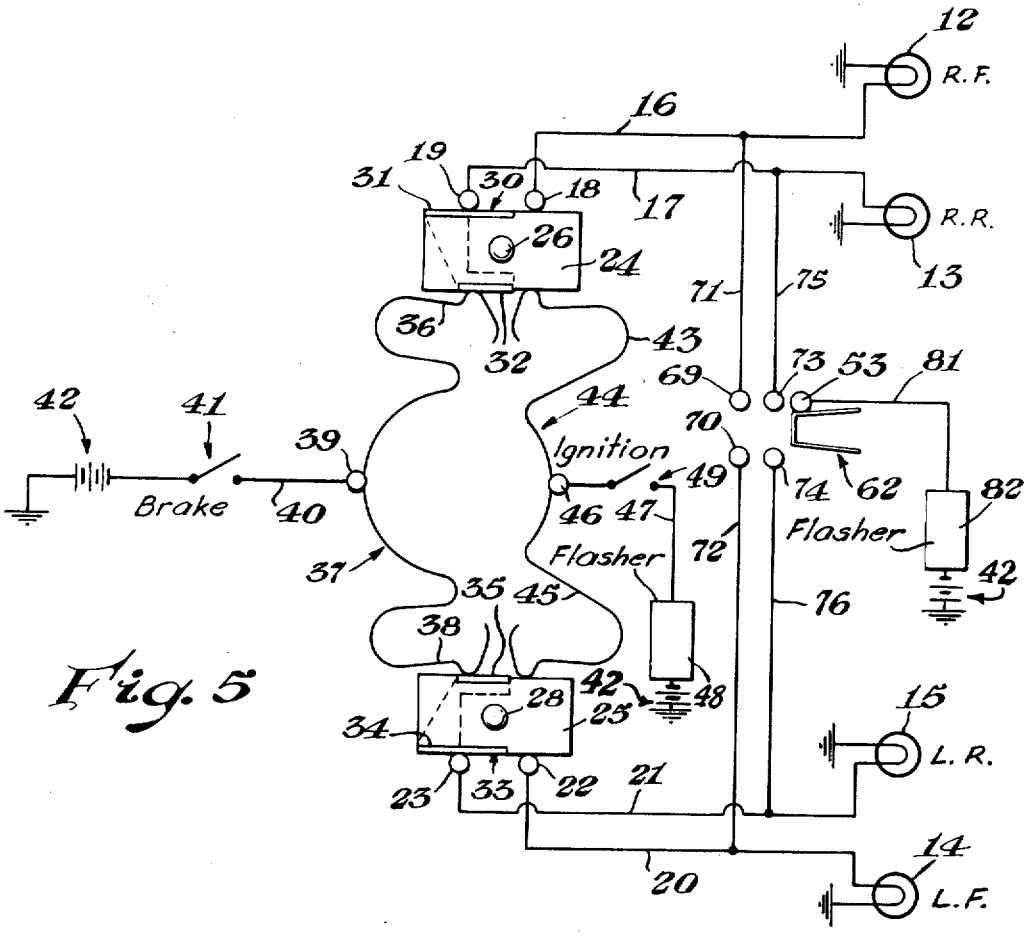
FIGURE 5 is a schematic wiring diagram of both the direction signaling circuitry and the warning signal circuitry.

The electrical circuitry for the direction signaling apparatus is schematically disclosed in FIGURE 5 and comprises a right front signaling lamp 12, a right rear signaling lamp 13, a left front signaling lamp 14 and a left rear signaling lamp 15. The right-hand set of signaling lamps are connected by wires 16 and 17 to contacts 18 and 19, respectively, that are mounted in the switch casing 5, and the left-hand set of lamps 14 and 15 are connected by wires 20 and 21 to contacts 22 and 23, respectively, which also are located within the switch casing 5.

Associated with the contacts 18 and 19 is a movable switch block 24 formed of insulating material, and a similar switch block 25 is associated with the contacts 22 and 23. The block 24 has an upstanding projection 26 that is received in a socket 27 formed in the actuator member 8, and the block 25 has a similar projection 28 that is received in a socket 29 in the actuator member so as to effect sliding movements of the blocks 24 and 25 in response to rocking movements of the actuator member to and from its operating position. The switch block 24 is provided with an electrically conductive member 30 having a pair of joined legs 31 and 32, and the switch block 25 includes a similar conductive member 33 having a pair of joined legs 34 and 35.

When the direction signaling mechanism is in its neutral position, the switch blocks 24 and 25 will be in the positions shown in FIGURE 5 wherein the conductive member 30 bridges the contact 19 and one leg 36 of an electrically conductive member 37 that is housed within the switch casing 5. The conductive member 33 bridges the contact 23 and a second leg 38 of the member 37. The member 37 constantly is in engagement with a contact 39 that is connected by a wire 40 through a brake pedal actuated switch 41 to one terminal of a battery 42 or other source of electrical energy. The arrangement of the parts thus far described is such that, when the direction signaling apparatus is in its neutral position and when the switch 41 is closed, electrical energy is supplied continuously to the right rear lamp 13 and to the left rear lamp 15 so as to cause the latter lamps to glow and indicate the application of the vehicle's brakes.

If it should be desired to indicate a turn to the right, for example, the operating lever 11 is rocked in a clockwise direction so as to cause corresponding rocking of the actuating member 8. Such movement of the actuating member will effect movement of the switch block 25 to the left, as viewed in FIGURE 5, and simultaneous movement of the block 24 to the right. Although the block 25 moves to the left, no change is made in its electrical connections. Movement of the block 24 to the right, however, will disengage the members 32 and 36 and effect engagement between the member 32 and one leg 43 of an electrically conductive member 44, the latter having a second leg 45 which lies adjacent the switch block 25. Movement of the block 24 to the right also will move the conductive leg 31 into engagement with the contact 18 so that the both of the contacts 18 and 19 are bridged by the member 31.

The member 44 is constantly in engagement with a contact 46 that is connected by wire 47 to one terminal of a conventional flasher unit 48. Preferably, the wire 47 is connected through the ignition switch 49 of the vehicle so as to prevent operation of the direction signaling lamps except when the switch 49 is closed.

In the adjusted position of the switch blocks 24 and 25, an intermittent current will be supplied from the battery 42 through the flasher unit 48 and through the members 43 and 30 to the contacts 18 and 19 so as to flash the right front and right rear lamps 12 and 13. The left hand set of lamps 14 and 15 will not be illuminated, however, although it would be possible to effect steady illumination of the left rear lamp 15 by closing of the brake switch 41.

When the right-hand turn is completed the steering shaft 1 and the cam 3 will be rotated in a counterclockwise direction, causing the cam to engage the projected finger 9 and restore the actuating member to its neutral position.

The operation of the apparatus to indicate a left-hand turn is similar to the operation just described, except that the actuating member 8 is rocked counterclockwise so as to effect shifting of the switch block 24 to the left and shifting of the switch block 25 to the right so as to effect flashing of the left-hand set of lamps 14 and 15.

In many instances it is desirable that a vehicle be equipped with some kind of device that may be utilized to warn drivers of other vehicles of the presence of a parked or disabled vehicle adjacent the road. Apparatus constructed in accordance with the invention enables both the left-hand set and the right-hand set of direction signaling lamps to be flashed simultaneously so as to enable the direction signaling lamps to function as warning devices.

In the disclosed embodiment of the invention, the warning signaling apparatus comprises a hollow casing 50 molded of electrically insulating material such as nylon or the like and formed in two halves 51 and 52 that may be secured together by metallic pins 53 or the like. The lower casing half 52 includes a pair of integral mounting ears 54 that may be secured to the mounting ring 6 by the screws 7. When the two casing halves are assembled, the casing is provided with an apertured forward wall 55 and an apertured rearward wall 56.

Slideably mounted within the casing 50 is a nylon or the like actuator 57 having an enlarged stem portion 58 and an integral reduced pawl or return portion 59 that forms a shoulder 60 with the stem 58 and terminates at its forward end in a chamfered edge 61. Slideably mounted on the pawl portion 59 is an electrically conductive member 62 having a flat base 63 that is adapted to bear against the shoulder 60 and from which extend rearwardly and outwardly inclined side leaves 64 and 65 and similar upper and lower leaves 66 and 67, respectively. The upper and lower leaves preferably are notched as at 66a. The member 62 is constantly maintained in snug engagement with the shoulder 60 by a fairly light compression spring 68 which reacts between the front wall 55 of the casing and the base 63 of the member 62.

The top half 51 of the casing includes a pair of electrically conductive contacts 69 and 70 which extend into the interior of the casing and which are connected at their outer ends to wires 71 and 72, respectively. The lower casing half 52 includes a similar pair of contacts 73 and 74 which are connected at their outer ends to wires 75 and 76, respectively.

Figure 2:
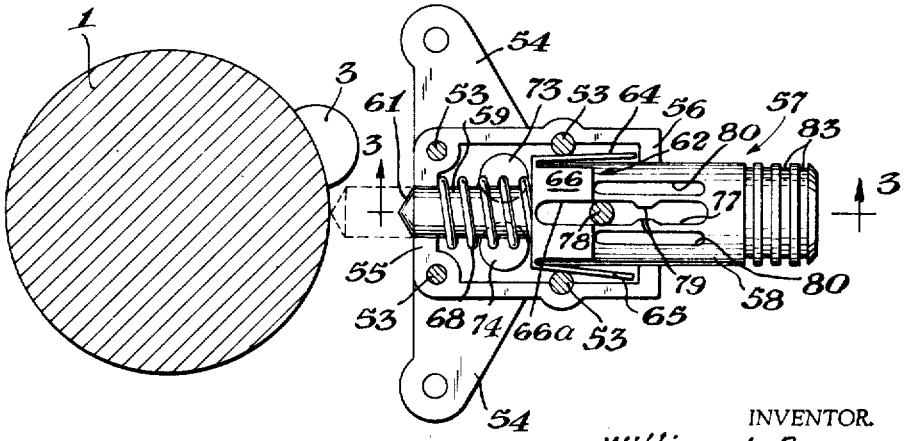
FIGURE 2 is a sectional view of the warning signal operating mechanism, on an enlarged scale, the section being taken on the line 2—2 of FIGURE 3.
Figure 4:
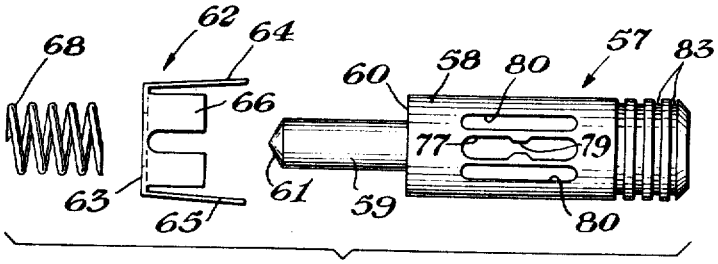
FIGURE 4 is an exploded view of a portion of the mechanism.

The actuator 57 is adapted to be moved from a disabled or inactive position as shown in full lines in FIGURE 2 to a second position in which the electrically conductive leaves 66 and 67 of the member 62, together with its base 63, bridge all four contacts 69, 70, 73, 74. The notches in the upper and lower leaves enable them to compensate for any inequalities of the size of the four contacts. In order to maintain the actuator 57 is its actuating position, the stem 58 is provided with an elongated slot 77 through which extends a pin 78 that is anchored in the casing 50. The slot 77 is provided with laterally directed detents or projections 79 that form a reduced throat section intermediate the ends of the slot, the ends of the projections being adapted to grip the pin 78 upon projection of the actuator 57 and yieldably hold the latter in the projected position indicated by the dotted lines in FIGURE 2 against the force of the spring 68. When the member 57 is in its disabled position, the projections 79 prevent inadvertent movement of the actuating member to its operating position. To provide the throat section of the stem 58 with sufficient flexibility to permit the passage of the pin 78 without undue wear, the stem may be provided with one or more slots 80 on opposite sides of the slot 77.

The construction and arrangement of the parts of the warning actuating mechanism thus far described should be such that when the casing 50 is mounted on the ring 6 the member 59 will be at a level corresponding to the level of the cam 3 so that, upon projection of the member 57, the edge 61 will lie in the path of rotation of the cam.

The electrical circuitry of the warning apparatus also is disclosed in FIGURE 5 and in the disclosed embodiment the contacts 69 and 70 are connected by their respective wires 71 and 72 to the right front and left front signaling lamps 12 and 14, respectively. The contacts 73 and 74 are connected by their wires 75 and 76 to the right rear and left rear signaling lamps 13 and 15, respectively. One of the pins 53 which hold the two case halves together may be connected by a wire 81 to a flasher 82 that is similar to the flasher 48. One of the side leaves 64 of the conductive member 62 always is in engagement with the pin 53 to which the flasher 82 is connected, and the other side leaf 65 bears against the other pin 53 to maintain the member 62 in balance.

The signaling lamps normally are inactive, but in the operation of the apparatus, movement of the actuator member 57 from its disabled position to its actuated position causes the member 62 to be engaged with all of the contacts 69, 70, 73, 74 and 53, whereupon intermittent energy is supplied from the battery 42 through the flasher 82 to all of the signaling lamps 12, 13, 14, and 15, so as to cause both sets of signaling lamps to flash simultaneously. The actuator member 57 will be maintained in its actuated position by the reaction between the pin 78 and the projections 79 at the throat section of the stem 58. When it is desired to cancel the warning signal, the steering shaft 1 may be rotated in either direction a distance sufficient to cause the cam 3 to engage the edge 61 of the member 57, whereupon force will be applied to the latter that is sufficient to permit passage of the pin 78 through the thoat section of the member 57 and effect restoration of the apparatus to its disabled position. If desired, the warning apparatus may be disabled manually by a driver's grasping the stem 58 with his fingers, and to facilitate manual canceling of the warning signal the outer end of the stem 58 may be grooved as at 83.

An important characteristic of the invention is that operation of the actuator member 57 effects sliding or wiping of the movable conductor 62 across the fixed contacts, thereby maintaining all of the contacts clean and bright.

Although it is possible to effect certain economies by connecting the actuating mechanism for the warning apparatus to the same lamps that are used to indicate turns, it would be possible to connect the wires 71, 72 and 75, 76 to signal lamps or devices that are independent of the turn signal lamps.

Preferably, the warning apparatus is not wired through the ignition switch of a vehicle, but instead is operable independently of the ignition system. Such an arrangement permits the warning apparatus to function without imposing the load of the ignition system on the battery of the vehicle.

[The disclosed embodiment is representative of a presently preferred form of the invention but is intended to be illustrative rather than definitive thereof. The invention is defined in the claims.]

I claim.

1. Signaling apparatus for a vehicle having normally inactive left-hand and right-hand signaling indicators and means *rotatable in either of two directions* for turning said vehicle selectively to the left or to the right, said apparatus comprising actuating means movable from a disabled position to a position to actuate simultaneously said left-hand and right-hand indicators; and means reacting between said actuating means and said turning means in response to [operation] *rotation* of the latter *in either of said directions* to return said actuating means to said disabled position *and deactuate simultaneously said left-hand and right-hand indicators.*

2. Signaling apparatus for a vehicle having normally inactive left-hand and right-hand direction signals, means operable to actuate selectively said left-hand and right-hand direction signals to indicate a left-hand or right-hand turn, and means *rotatable in either of two directions* for turning said vehicle selectively to the left or to the right, said apparatus comprising actuating means movable from a disabled position to a position to actuate simultaneously said left-hand and right-hand direction signals; and means reacting between said actuating means and said turning means in response to [operation] *rotation* of the latter *in either of said directions* to return said actuating means to said disabled position *and deactuate simultaneously said left-hand and said-right hand direction signals.*

3. Signaling apparatus for a vehicle having electrically operated, normally inactive left-hand and right-hand direction signals, operating means operable to actuate selectively said left-hand and right-hand direction signals to indicate a left-hand or right-hand turn, and means for turning said vehicle selectively to the left or to the right, said apparatus comprising actuating means independent of said operating means and movable from a disabled position to a second position to actuate simultaneously said left-hand and right-hand direction signals; means acting on said actuating means and yieldably maintaining the latter in said second position; and means reacting between said actuating means and said turning means in response to operation of the latter to return said actuating means to said disabled position.

4. Signaling apparatus for a vehicle having electrically operated, normally inactive left-hand and right-hand direction signals, operating means operable to actuate selectively said left-hand and right-hand direction signals to indicate a left-hand or right-hand turn, and means for turning said vehicle selectively to the left or to the right, said apparatus comprising actuating means independent of said operating means and movable from a disabled position to a second position to actuate simultaneously said left-hand and right-hand direction signals; means acting on said actuating means and yieldably maintaining the latter in either of said positions; and means reacting between said actuating means and said turning means in response to operation of the latter to return said actuating means to said disabled position.

5. Signaling apparatus for a vehicle having normally inactive signaling devices at the left-hand and right-hand sides thereof and [movable] steering means *rotatable in either of two directions* for turning said vehicle, said steering means including a part movable therewith in a path, said apparatus comprising actuating means movable from a disabled position to a second position operable to actuate simultaneously all of said signaling devices, said actuating means in its said second position projecting into the path of movement of said steering part for engagement therewith *in response to rotation of said steering means in either of said directions,* engagement between said steering part and said actuating means restoring the latter to said disabled position *and simultaneously deactuating all of said signaling devices.*

6. Signaling apparatus for a vehicle having normally inactive signaling devices at the left-hand and right-hand sides thereof and [movable] steering means *rotatable in either of two directions and* including a part movable therewith in an orbital path, said apparatus comprising actuating means; means mounting said actuating means adjacent said steering means for movement from a disabled position to a second position operable to actuate simultaneously all of said signaling devices, movement of said actuating means projecting the latter into the path of said steering part for engagement therewith *in response to rotation of said steering means in either of said directions,* engagement between said steering part and said actuating means restoring the latter to said disabled position; and means acting on said actuating means for yieldably maintaining the latter in either of its said positions.

7. Signaling apparatus for a vehicle having normally inactive, eletrically operated signaling devices at het left-hand and right-hand sides thereof and movable steering means including a part movable therewith in an orbital path, said apparatus comprising a casing member; electrically conductive contact means in said casing member connected to each of said signaling devices; electrically conductive means; and actuating member supporting said electrically conductive means and mounted in said casing member for movement from a first position in which said electrically conductive means is disengaged from said contact means to a second position in which said conductive means engages said contact means so as to operate simultaneously all of said signaling devices; and return means supported by said actuating members and movable with the latter to said second position into the path of movement of said steering part for engagement therewith, engagement of said return means with said steering part effecting return movement of said actuating member to said first position and disengagement of said conductive means and said contact means.

8. The apparatus set forth in claim 7 including means acting on said actuating member and yieldably maintaining the latter in either of its said positions.

9. The apparatus set forth in claim 8 wherein said maintaining means comprises cooperable detent means on said actuating member and said casing member.

10. The apparatus set forth in claim 9 wherein said cooperable detent means comprises a pin on one of said members and a groove in the other said members, said groove having a reduced width portion between its ends.

11. Signaling apparatus for use with a vehicle having left-hand and right-hand sets of direction signaling devices and rotatable means for turning said vehicle, said turning means including cam means movable therewith, said apparatus comprising actuating means movable from a neutral position to operating positions on opposite sides of said neutral position; first switch means operable in response to movement of said actuating means to operate a selected one of said sets of signaling devices; return means carried by said actuating means and being movable into the path of said cam means for engagement thereby in response to movement of said actuating means from said neutral position either of said operating positions; second switch means adapted for connection to said sets of direction signals; second actuating means independent of said first actuating means; means mounting said second actuating means for movement from a disabled position to an operating position; means operable in response to movement of said second actuating means to said operating position to connect said second switch means with both of said sets of direction signals simultaneously; and return means carried by said second actuating means and movable in response to movement of said second actuating means to said operating position into the path of said cam means for engagement thereby.

12. The apparatus set forth in claim 11 including yieldable means acting on said second actuating means and yieldable maintaining the latter in either of its said positions.

13. The apparatus set forth in claim 12 wherein said yieldable means comprises cooperable detent means on said second actuating means and on the mounting means for the latter.

14. The apparatus set forth in claim 13 wherein said detent means includes a slot having a reduced width portion between its ends and a pin received in said slot.

15. Apparatus for simultaneously operating warning devices at the left- and right-hand sides of a vehicle having rotable steering means including a part movable in a path upon rotation of said steering means, said apparatus comprising a casing member; a plurality of contact elements extending into said casing member; an actuating member slideably mounted by said casing member for movement from a disabled position to an operating position; conductive means supported by said actuating member and movable with the latter into and out of engagement with said contact elements; returns means supported by said actuating member and movable with the latter into the path of said steering part for engagement therewith; and cooperable detent means reacting between said members and operable yieldably to maintain said actuating member in either of said positions.

16. Apparatus as set forth in claim 15 wherein said detent means comprises a slot in one of said members having a reduced throat portion between its ends, and a pin secured to the other of said members and received in said slot pin having a dimension larger than the corresponding dimension of said throat portion.

17. Apparatus as set forth in claim 16 wherein said slot is in said actuating member and said pin is secured to said casing member.

18. In a vehicle having [rotatable] steering means *rotatable in either of two directions and* including a part movable therewith in an orbital path and having left-hand and right-hand signaling means, the combination of switch means movable from a disabled position to an operating position for actuating simultaneously said left-hand and right-hand signaling means; and return means movable into the path of said steering part in response to movement of said switch means to said operating position and engageable by said part upon rotation of said steering means *in either said directions* to return said switch means to said disabled position and *deactuate simulatneously said left-hand and right-hand signaling means.*

19. A switch construction comprising a casing member; a plurality of spaced apart contacts supported by said casing member; and actuating member supported by said casing member for movements between first and second position; bridging means supported by said actuating member and movable with the latter into and out of bridging engagements with said contacts; yieldable means reacting between said casing member and said actuating member and exerting a force on the latter urging it toward one of said positions; and cooperable detent means reacting between said casing member and said actuating member and yiedably maintaining the latter in either of said positions, said cooperable detent means comprising a projection on one of said members and a slot in the other of said members receiving said projection, said slot having a reduced width portion between its ends of such size as to engage said projection with sufficient frictional force to overcome the force of said yieldable means.

References Cited

The following references, cited by the Examiner, are of record in the pattented file of this patent or the original patent.

UNITED STATES PATENTS

| | | | |
|---|---|---|---|
| 2,364,143 | 12/1944 | Horton et al. | 340—56 XR |
| 2,617,902 | 11/1952 | Lincoln et al. | 200—61.34 |
| 2,656,426 | 10/1953 | Dibelka | 200—61.27 |
| 2,667,602 | 1/1954 | Flemming | 315—77 |
| 2,667,627 | 1/1954 | Hollins | 340—81 |
| 2,704,360 | 3/1955 | Werstein | 340—56 XR |
| 2,771,525 | 11/1956 | Sivak | 200—61.27 |
| 2,812,396 | 11/1957 | Hollins | 200—61.35 |
| 2,854,649 | 9/1958 | Boscher | 340—74 |
| 2,942,236 | 6/1960 | Hollins | 340—81 |
| 3,114,015 | 12/1963 | Magazanik | 200—61.27 |

ALVIN H. WARING, Primary Examiner

U.S. Cl. X.R.

200—61.35; 340—74